(No Model.)  H. B. HART.  2 Sheets—Sheet 1.
BICYCLE SADDLE.

No. 285,891.   Patented Oct. 2, 1883.

WITNESSES:
N. H. Cenbwv
Geo. T. Kelly

INVENTOR
H. B. Hart
by Collier & Bell
attys.

(No Model.) 2 Sheets—Sheet 2.

H. B. HART.
BICYCLE SADDLE.

No. 285,891. Patented Oct. 2, 1883.

WITNESSES:
N. H. Cenbron.
Geo. T. Kelly.

INVENTOR
H. B. Hart,
By Collier & Bell,
attys.

UNITED STATES PATENT OFFICE.

HARRIE B. HART, OF PHILADELPHIA, PENNSYLVANIA.

BICYCLE-SADDLE.

SPECIFICATION forming part of Letters Patent No. 285,891, dated October 2, 1883.

Application filed March 20, 1883. (No model.)

*To all whom it may concern:*

Be it known that I, HARRIE B. HART, of the city and county of Philadelphia, in the State of Pennsylvania, have invented certain new and useful Improvements in Bicycles, of which improvements the following is a specification.

The objects of my invention are to enable the seat or saddle of a bicycle to be brought as closely as practicable to the backbone thereof, and correspondingly to increase the admissible diameter of wheel, and to provide such means for the elastic support of the seat as will enable the same to be readily and conveniently adjusted at different points to conform to the desired position of the rider.

To these ends my improvements consist in the combination of a supporting-spring and a saddle adjustable both vertically and longitudinally thereon; also, in a spring having a coil at each of its ends interposed between its points of connection to the backbone and to the saddle of the bicycle, respectively, so as to provide separate and independently-adjustable elastic supports at each of its ends. The improvements claimed are hereinafter more fully set forth.

Figure 1:
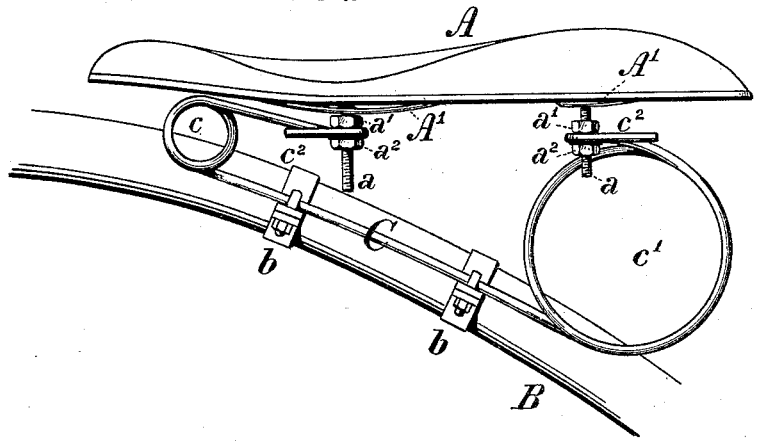
Figure 2:
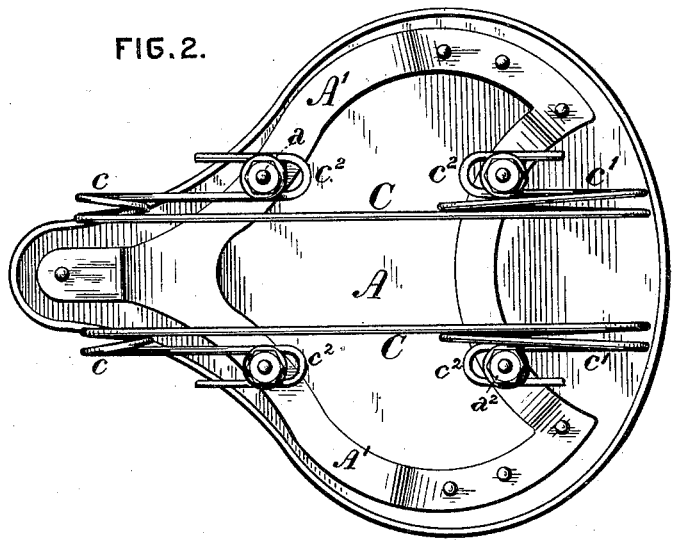
Figure 3:
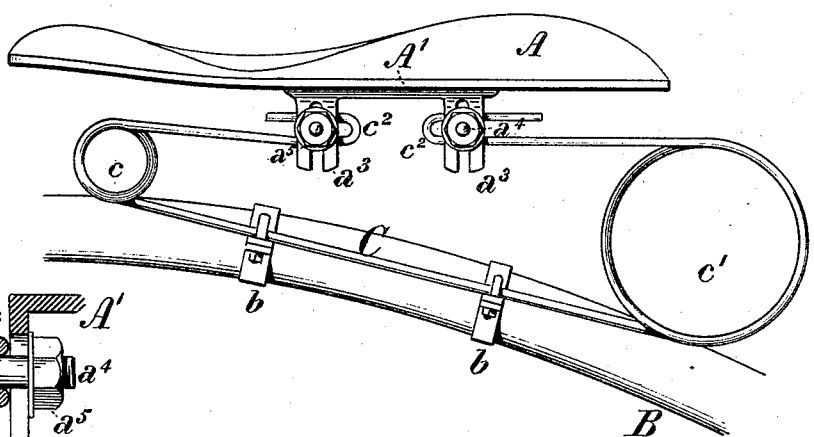
Figure 4:
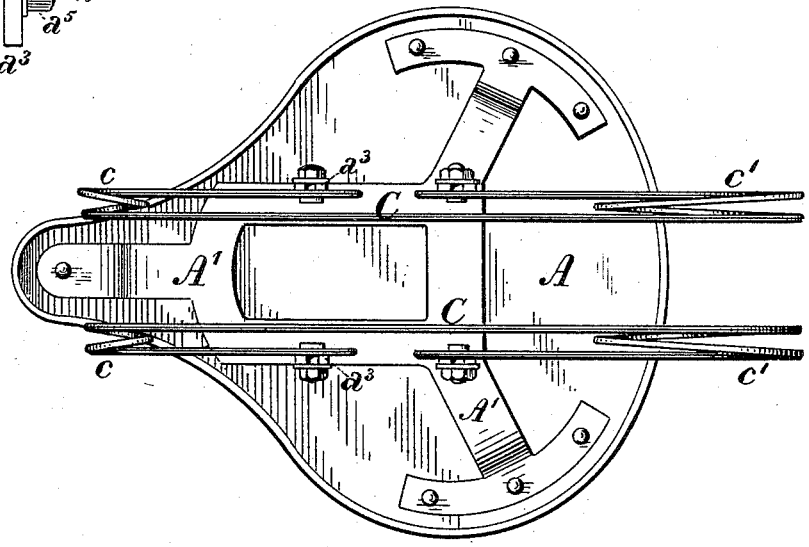

In the accompanying drawings, Figure 1 is a side view, in elevation, of the spring and saddle of a bicycle embodying my invention; Fig. 2, an inverted plan view of the same; Fig. 3, a side view, in elevation, of a saddle and spring, showing a modification of the connection thereof. Fig. 4 is an inverted plan view of the same; and Figs. 5 and 6, sections on an enlarged scale through the spring and saddle-frame, illustrating, respectively, different means of adjustment.

In the practice of my invention I secure to the bottom of the seat or saddle A of the bicycle a metallic plate or skeleton frame, A', and connect said plate to the perch or backbone B by two springs, C, each of which is attached at two points to the saddle, and intermediately by one or more clips, $b$, to the backbone. Each of the springs C is formed of a single length of wire, the central portion of which is straight, and which is bent into one or more coils, $c\ c'$, between said central portion and its front and rear ends, respectively. The springs C are coupled independently at or near their front and their rear ends to the frame A' of the saddle, which they thus support at four different points, with the capacity of adjustment both vertically and longitudinally at each of said points.

Referring to Figs. 1 and 2, the connection of the springs and saddle-frame is shown as effected by studs $a$, each of which is secured to and projects downwardly from the frame A'. The studs $a$ pass through loops or eyes $c^2$, formed by bending the ends of the springs C, exterior to the coils $c\ c'$, into U form, and are clamped in said loops by upper and lower nuts, $a'\ a^2$. It will be seen that by slackening the nuts the saddle may be moved longitudinally upon the springs, and by the adjustment of the nuts of each stud the corresponding portion of the saddle may be raised or lowered, as desired, and maintained in such adjusted position.

Figure 5:
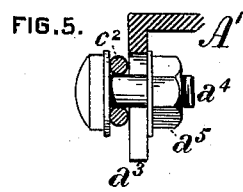
Figure 6:
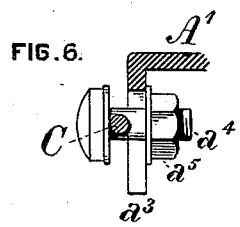

In the modification shown in Figs. 3, 4, and 5 four vertically-slotted guides, $a^3$, are formed upon or secured to the frame A', and said guides are coupled adjustably to the loops $c^2$ of the springs by bolts $a^4$, provided with nuts $a^5$, adapted to bear against the guides $a^3$ and clamp the loops $c^2$ firmly thereto. The vertical and longitudinal adjustment of the saddle at its four points of support is effected, as desired, by the bolts and nuts.

In lieu of forming loops upon the ends of the springs, as above set forth, said ends may, if preferred, remain unbent, and be clamped adjustably to the guides $a^3$ by passing through openings formed in the bolts $a^4$, as shown in Fig. 5, the required adjustments being effected, as required, by slackening and tightening the nuts, as before.

The application of my improvements, which are lighter and simpler than the usual devices, enables the saddle to be brought much closer to the backbone than is ordinarily admissible, thereby allowing a correspondingly larger wheel to be employed, and the capacity of adjustment of the saddle which is provided affords greater comfort to the rider in fitting the seat to his person in any required plane. Further, the saddle, being supported independently at four different points, accommodates itself readily to the varied positions of the rider, and by the changes of leverage at the ends of the springs their elastic action upon the saddle may be correspondingly varied.

I claim as my invention and desire to secure by Letters Patent—

1. The combination, substantially as set forth, of a supporting-spring and a saddle which is adjustable both vertically and longitudinally thereon.

2. The combination, substantially as set forth, of a saddle, two supporting-springs, each connected adjacent to each of its ends to the saddle, and devices for independently adjusting the saddle relatively to the springs at each of its points of connection therewith.

3. The combination, substantially as set forth, of a perch or backbone, a pair of supporting-springs, and a saddle connected adjustably at two points to each of said springs.

4. The combination, substantially as set forth, of a saddle, a lower frame secured thereto, four threaded studs attached to said frame, and a pair of springs having eyes at or near their ends, adapted to be clamped by nuts to said studs.

5. The combination, substantially as set forth, of a saddle, a lower frame attached thereto, four slotted guides attached to said frame, and a pair of springs adapted to be clamped at or near their ends to said guides.

6. A spring for bicycles, having a substantially straight middle portion, one or more coils between said middle portion and each of its ends, and an eye or loop at or adjacent to each of its ends.

HARRIE B. HART.

Witnesses:
J. SNOWDEN BELL,
WALTER S. GIBSON.